US006871820B2

(12) United States Patent
Wilksch

(10) Patent No.: US 6,871,820 B2
(45) Date of Patent: Mar. 29, 2005

(54) AIRCRAFT ENGINE MOUNTING

(76) Inventor: Mark Conrad Wilksch, 8 Partridge Close, Buckingham Bucks MK18 7HH (GB)

( * ) Notice: Subject to any disclaimer, the term of this patent is extended or adjusted under 35 U.S.C. 154(b) by 0 days.

(21) Appl. No.: 10/243,091

(22) Filed: Sep. 13, 2002

(65) Prior Publication Data

US 2003/0010866 A1 Jan. 16, 2003

Related U.S. Application Data

(63) Continuation-in-part of application No. 09/552,392, filed on Apr. 19, 2000, now abandoned.

(51) Int. Cl.$^7$ ............................................. B64D 27/26
(52) U.S. Cl. .......................................... 244/54; 244/55
(58) Field of Search .......................... 244/54, 53 R, 244/55, 62

(56) References Cited

U.S. PATENT DOCUMENTS 5,409,184 A * 4/1995 Udall et al. ................... 244/54
6,123,293 A * 9/2000 Breitbach et al. ............. 244/54
6,398,161 B1 * 6/2002 Jule et al. ..................... 244/54
6,581,874 B2 * 6/2003 Lemire et al. ................ 244/54

FOREIGN PATENT DOCUMENTS

| GB | 554860 | * 10/1942 | .................. 244/54 |
| GB | 548527 | *  7/1943 | .................. 244/54 |

* cited by examiner

Primary Examiner—Michael J. Carone
Assistant Examiner—Gabriel Sukman
(74) Attorney, Agent, or Firm—Artz & Artz, PC

(57) ABSTRACT

An aircraft engine mounting installation uses an overall partially focalized or convergent mount configuration with a combination of individual, or paired, axial mounts and individual, or paired, inclined mounts. When paired, the axial mount axes are parallel to the engine thrust axis. The respective axes of the axial and inclined mounts, or planes through paired similar mounts, converge at, or ahead of, the engine center of gravity in order to brace engine weight, engine thrust and torque reaction loads, without undue complexity in mount geometry.

17 Claims, 5 Drawing Sheets

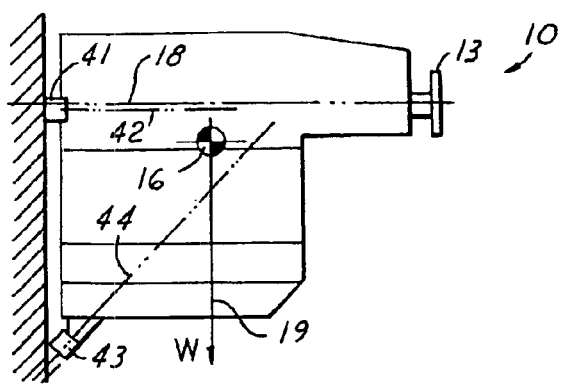
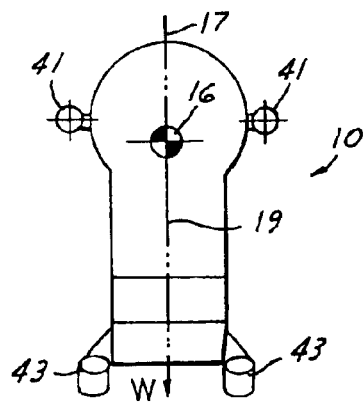
FIG.4A  FIG.4B
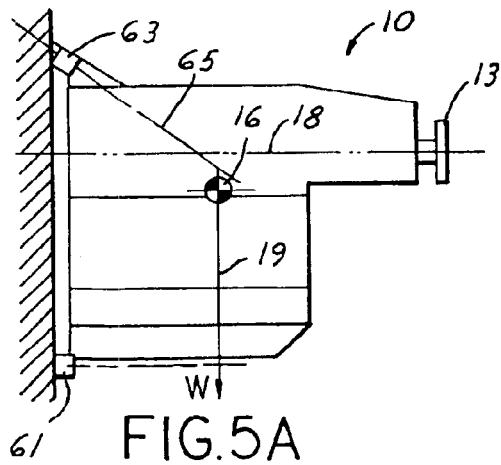
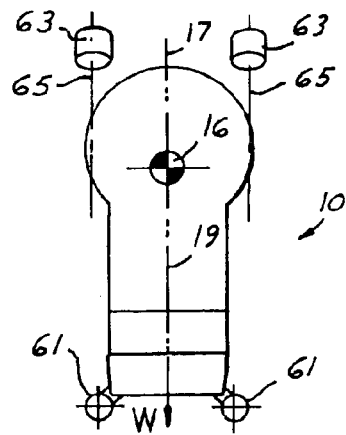
FIG.5A  FIG.5B
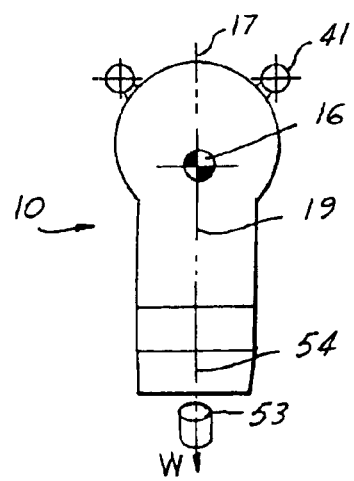
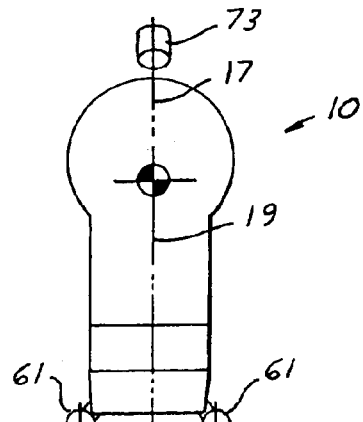
FIG.6  FIG.7

AIRCRAFT ENGINE MOUNTING

CROSS-REFERENCE TO RELATED APPLICATIONS

This is a continuation-in-part of U.S. patent application Ser. No. 09/552,392, filed on Apr. 19, 2000, now abandoned.

TECHNICAL FIELD

This invention relates to engine mountings and more particularly to aircraft engine mounts and installations for aircraft engine bays.

BACKGROUND OF THE INVENTION

Aircraft engines (both reciprocating piston and turbine) which drive a propeller, or ducted fan, are typically installed in a fuselage and/or wings. The disposition of the engine installation may be forward or rearward, in relation to the aircraft longitudinal axis and its leading or trailing aerodynamic (lift) surfaces. Similarly, the engine orientation and attendant propeller may be puller or pusher configurations.

An engine represents a concentrated mass of robust form compared with an airframe structure and so an engine mounting must "marry" the engine and airframe, by distributing imposed loads.

In both fuselage and wing installation, an engine is typically mounted upon a bulkhead, disposed at the opposite end from the thrust propeller, or upon a structure extended beneath and/or alongside the engine. In the case of a fuselage, the bulkhead separates the engine and passenger or baggage compartments.

A requirement for low noise and/or vibration transmission from the engine to occupants in the passenger compartment commonly dictates the use of compliant, for example, metallic or elastomeric, mountings in supporting an engine assembly from or upon an airframe. Essentially the mount configurations depicted in FIGS. 1A through 3B and FIGS. 12 and 13 of the patent drawings disclose known aircraft engine mount systems. These mounting systems include a "bed mount" system which is reliant upon engine support from below by an extended underlying structure (FIGS. 1A and 1B); a side mount system which is used with in-line engines and involves two mounts to either side of the engine and a beam or truss structure extending from the aircraft bulkhead (FIG. 12); and an end mount system with an engine cantilevered from one end opposite a thrust (pusher or puller) propeller (FIGS. 2A–2B, 3A–3B, and 13A–13B). Both the "bed" and "side" mount systems include considerable supplementary structure beyond (forward of) a bulkhead.

For low cost and simplicity, an end arrangement is preferable since it minimizes airframe structural extension. Thus, with an end-mount, a minimal intervening frame between engine and bulkhead can be employed.

An end mount with multiple individual mount axes disposed around and each orientated substantially parallel to the engine thrust axis, i.e. a so-called "axial mount" represents a simple solution. In this case, each individual (axial) mount is loaded (transversely) in shear under aircraft normal maneuvering load (FIGS. 2A–2B).

A primary vibration transmission mode arises from the pulsing torque reaction of the engine, particularly with a piston engine where the power generation is cyclical or intermittent. Individual axial mountings of an end mount configuration are shear loaded by oscillatory torque reaction while having greater tension or compression stiffness in order to withstand propeller thrust reaction and maintain alignment of the propeller with the aircraft (longitudinal) axis. A low mount shear stiffness while advantageous for absorption, cushioning or reduced transmission of (torque) vibrations, allows significant vertical deflection under "g" loads. This results in significant displacement of the propeller undermining maintenance of alignment between spinner and cowling, thereby requiring a larger operating clearance, and "bottoming out" of the mounts, i.e. the mounts come to the end of their allowable "soft" travel and become a more rigid connection defeating the purpose of their softness in shear.

For better performance the end mounts are sometimes focalized, i.e. disposed about the engine thrust axis with their individual axes orientated towards a (common) point near, or ahead of, the engine center of mass. In this manner the mounts are placed primarily in tension, or compression, rather than in shear, under normal aircraft "g" loading, and so are unlikely to "bottom out"; the axial stiffness remains high in order to absorb thrust load without excessive deflection; and the torsional stiffness, i.e. stiffness to oscillatory torque reaction loads, is low and substantially independent of "g" load and side load giving good isolation under all flight conditions. FIGS. 13A–13B show a known application of a DYNAFOCAL (trademark of the Lord Corporation) focalized system as applied to a horizontally opposed aircraft piston engine. FIG. 3 shows such a focalized system applied to another engine configuration, namely an "inverted" piston engine.

With attention to such focalizing, i.e. the position of the focal point (usually a little forward of the center of gravity), deflection of the propeller under normal "g" loading can be minimized or even practically eliminated in some cases. This is an advantage when designing spinner-to-cowling clearances. On occasion, such focalized mountings are employed with common support frame such as a prefabricated lattices of tubular struts and ties known as a "ring-beam". While this predefines the mount configuration, it represents a complex and expensive additional element.

SUMMARY OF THE INVENTION

In accordance with the present invention, a mount configuration is provided for an airplane engine installation with a plurality of resilient engine-to-airframe mounts. The mounts include one or more axial mounts with respective axes generally parallel to an engine thrust axis, and one or more "inclined" mount with respective axes orientated to intersect a notional plane containing the axial mount axes, at, or ahead of, the engine center of gravity. Thus, for example, a plurality of parallel, or convergent, inclined mounts are employed in an overall partially focalized or convergent engine mount configuration.

Under aircraft normal "g" loads, such a (partially) convergent or "convergent plane", configuration according to the invention retains advantages of simplicity in axial mounts, yet provides comparable performance to the known (linearly) focalized or convergent mounts, such as the "DYNAFOCAL" mount, i.e. low deflection of the propeller hub, while avoiding complex (manufacturing) geometry.

In a particular mount configuration, a pair of upper axial mounts is disposed on opposite sides of, and generally at, or marginally (e.g. 50 mm), above or below the engine thrust line. In this configuration, an upper axial mount pair can be used in conjunction with either a single or multiple (in particular paired) lower inclined mounts. More specifically, the lower inclined mounts are individually orientated with their respective axis inclined to intersect a notional plane containing the upper mount axes at or ahead of the engine center of gravity. In the case of a single (lower) inclined mount, the mount axis may be contained in a vertical plane through the engine center line, or disposed somewhat to one side.

However orientated, that is, whether axial or inclined, paired mounts may be disposed symmetrically, or asymmetrically, with respect to a notional (vertical) plane of symmetry of the engine, taken through the engine center line.

Paired mounts, of a similar character, or orientation, may be disposed at the same or different heights. In this regard, the qualifiers "upper" (or top) or "lower" (or bottom) are both relative to one another, and relate to a "normal" operating orientation of the aircraft (whether the engine installation is upright, inverted, or otherwise).

Some, or all, mounts may be disposed below the engine thrust line. Some, or all, mounts may be disposed above, or below, the engine center of gravity. Mounts disposed rearwardly of and above the engine center of gravity are tensioned (axially) by the cantilever suspension of the engine weight. Mounts disposed rearwardly of and below the engine center of gravity are compressed (axially) in bearing the cantilevered engine weight.

Desirably, in the case of either axial or inclined mounts whether disposed upper or lower, the respective mount axes are generally parallel.

Generally, while the deployment of four mounts disposed in two pairs provides a certain "redundancy", it is feasible to deploy only three mounts, such as paired mounts at one level and a single mount at another level. A notional inclined plane containing both paired inclined mount axes intersects a notional (generally horizontal) plane containing the (upper or lower) axial mount axes, at, or ahead of, the engine center of gravity. Preferably, upper mounts are disposed at or near (e.g. below) the engine thrust line and are relatively stiff in tension or compression for minimal deflection under engine (propeller) thrust. In that case, the lower mount is orientated so that its axis is inclined to the engine thrust axis.

In another embodiments, paired inclined (upper or lower) mounts could be disposed with their respective axes linearly convergent or focalized, for example, to a point at or ahead of the engine center of gravity and also intersecting a notional plane containing paired axial mounts at the opposite (lower or upper) side of the engine. Such optional "linear" convergence, or focalizing, of one (upper or lower) inclined mount pair, would reflect an overall part-focalized mount configuration, but differentiated by the other (lower or upper) mounts remaining axial.

Through optimization by (e.g. finite element) analysis, the more readily implemented mount configuration of the present invention allows both low deflection, under normal "g" loads; and low stiffness under engine torsion, resulting in low transmission of oscillatory engine torque reactions to the airframe.

The optimal angle of inclined mounts is preferably 15° to 45° to the horizontal, depending upon engine configuration. While the mount configuration may allow higher deflections under sideways (lateral) loading than might occur for a typical DYNAFOCAL or side mount system, this is not a primary concern in non-aerobatic aircraft.

A single (upper or lower) mount is advantageous with restricted engine installation space as with engine conversions into engine bays and to pick up air frame capture points not originally designed for them. Mount attachment to an engine could be facilitated by incorporating integral extensions, such as lugs or ears, in the engine casing or housing. For axial mounts, such lugs merely require boring in a direction parallel to the engine axis in common with the various other engine axial bores and features. Thus no supplementary machining set-up is required for machining of such lugs.

Integral casing mounts could in principle be used for inclined mounts, but generally subject to machining set-up unless cast or otherwise formed with sufficient accuracy.

BRIEF DESCRIPTION OF THE DRAWINGS

There now follows a description of some particular embodiments of the invention, by way of example only, with reference to the accompanying diagrammatic and schematic drawings, in which the mount configurations depicted in FIGS. 4A through 10 are variants embodying the present invention:

FIGS. 4A–4B, 5A–5B, 6, 7, 8, and 9 show embodiments of mounting systems in accordance with the present invention applied to a typical "inverted" aircraft engine configuration by way of example;

FIGS. 4A and 4B show respectively side and end elevations of a partially convergent or focalized mount, four-point mount configuration according to the invention, with paired upper axial mounts and paired lower inclined mounts;

FIGS. 5A and 5B show respectively side and end elevations of a mount configuration reversed (by inversion) to that of FIGS. 4A and 4B that is with paired upper inclined mounts and paired lower axial mounts;

FIG. 6 shows an end elevation of a variant of FIGS. 4A and 4B with paired upper axial mounts and an individual lower inclined mount;

FIG. 7 shows an inversion of the mount configuration of FIG. 6, that is, with paired lower axial mounts and a single upper inclined mount;

FIG. 8 shows a variant of FIG. 7 with paired lower inclined mounts and a single upper axial mount;

FIG. 9 shows an inversion of the mount configuration of FIG. 8, that is, with paired upper inclined mounts and a single lower axial mount;

DESCRIPTION OF THE PREFERRED EMBODIMENT(S)

Figure 1A:
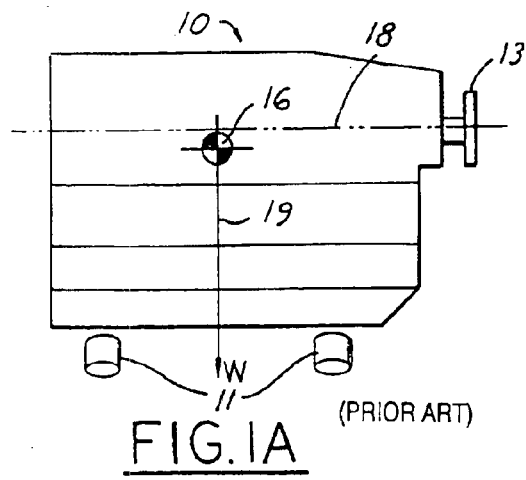
FIGS. 1A and 1B show respectively side and end elevations of a typical "bed mount" system.

For convenience of illustration and description, the same reference numerals are used for generally corresponding components in the various drawings.

An (inverted, piston) aircraft engine 10, has a center of gravity 16, with a weight W, along an action line 19. A thrust action center line 18 runs through an internal crankshaft (not shown) with an integral propeller mounting flange 13 at one output end. Diverse engine configurations and combustion types can be substituted for that depicted, including the common non-inverted, horizontally-opposed and radial configuration piston engines and the rotary (e.g. Wankel) type engine and the gas turbine ("turbo-prop") engine.

While the engine's thrust line position and center of gravity position are relevant to the exact alignment of the mounts according to the present invention, the actual engine configuration is of little consequence and indeed the invention can be applied to any motive power device used to drive a propeller and mounted at or near a bulkhead.

Figure 1B:
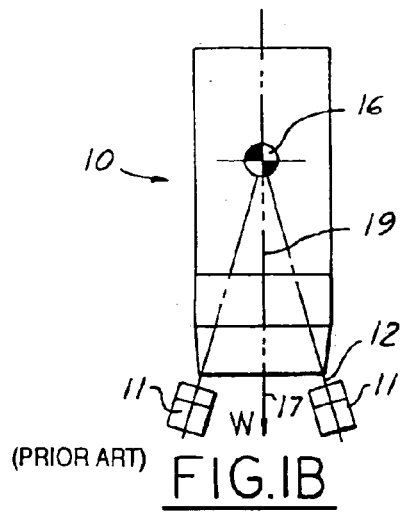

FIGS. 1A and 1B show a "bed mount" configuration, in which two pairs of lower inclined "bed mounts" 11 are disposed at opposite ends and at opposite sides of the engine 10. FIG. 1A shows the inclined bed mounts 11 disposed at opposite sides of, and below, the engine center of gravity 16 and below the engine thrust action line 18. FIG. 1B shows the inclined bed mounts 11 generally symmetrically disposed upon opposite sides of a notional vertical plane of symmetry 17, through the center of gravity 16. The inclination of their mount axes 12 is orientated to intersect the engine thrust (center) line near the center of gravity.

Figure 2A:
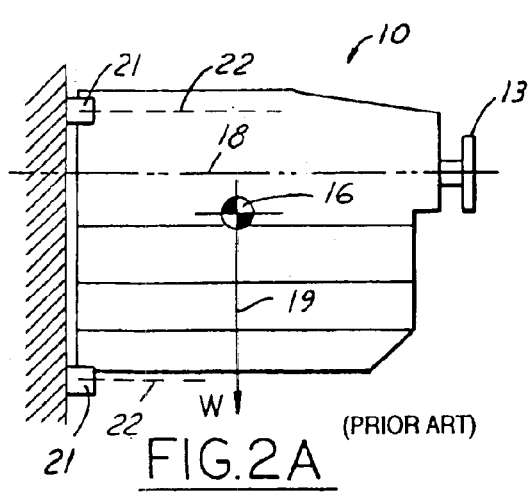
FIGS. 2A and 2B show respectively side and end elevations of a typical "end mount", "back mount" or "cantilever mount" (system) referred to jointly as an "end mount" system.
Figure 2B:
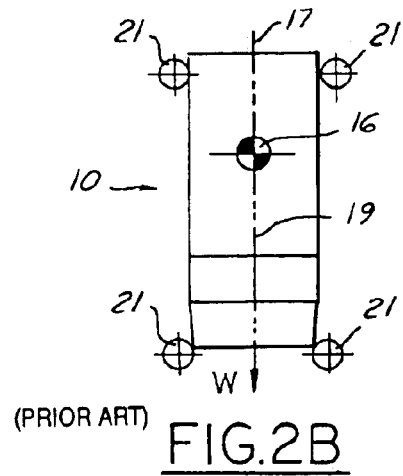

FIGS. 2A and 2B show an "end mount" configuration in which upper and lower pairs of end mounts 21 at one (say rearward) end of an engine 10 opposite the thrust propeller mounting flange 13 each have their respective axes 22 oriented generally parallel to the engine thrust axis 18. The end mounts 21 are also known as axial mounts not that their axes coincide with the engine crank shaft and thrust axis 18, but given their parallel alignment with it.

FIG. 2A shows an upper (pair of) axial mounts 21 disposed above the engine thrust line 18 and a lower (pair of) axial mounts 21 disposed below the thrust line 18. FIG. 2B shows both the upper and lower pairs of axial mounts 21 symmetrically disposed upon opposite sides of a notional plane of symmetry 17 vertically through the engine center of gravity 16. Some variation in actual disposition of axial mounts are possible, but only to reflect engine profile and airframe engine bay constraints and not to change their axial orientation.

Figure 3A:
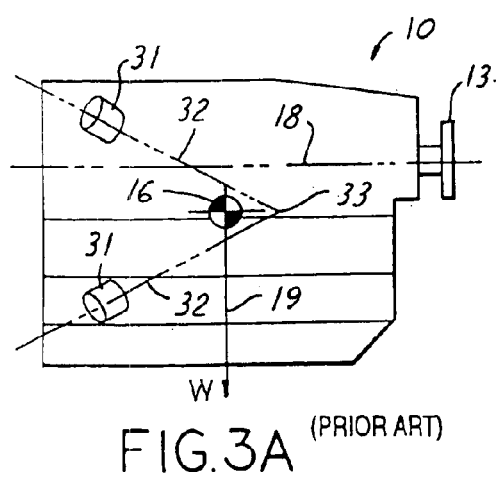
FIGS. 3A and 3B show respectively side and end elevations of a typical "focalized mount" system.
Figure 3B:
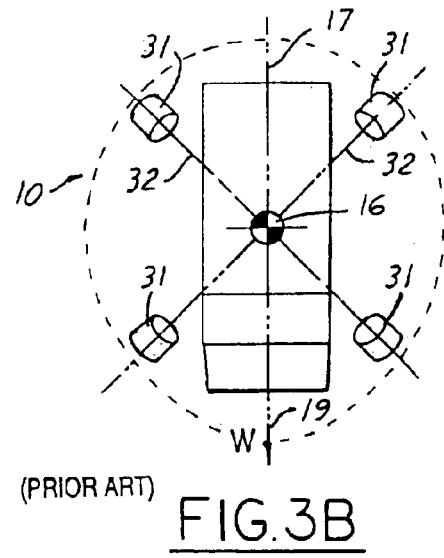

FIGS. 3A and 3B depict an engine 10 suspended from the rearward end opposite a propeller mounting flange 13 through an array of inclined or convergent mounts 31, such as the known 'DYNAFOCAL™' system. The respective mount axes 32 are orientated to converge at a common focus 33 at, or ahead of, the engine center of gravity 16. FIG. 3B shows the symmetrical disposition of convergent mounts 31 about a notional plane of symmetry 17 through the engine center of gravity 16. Such a focalized, or linearly convergent, mount configuration requires elaborate orientation alignment of the mounts and involves compound angles. On occasion, such alignment is implemented through a prefabricated structure called a "ring-beam" (not shown) intervening between the engine and airframe. In practice, such a ring beam may be structured as a lattice framework of bars or tubes serving as compression struts or tension ties.

Figure 14:
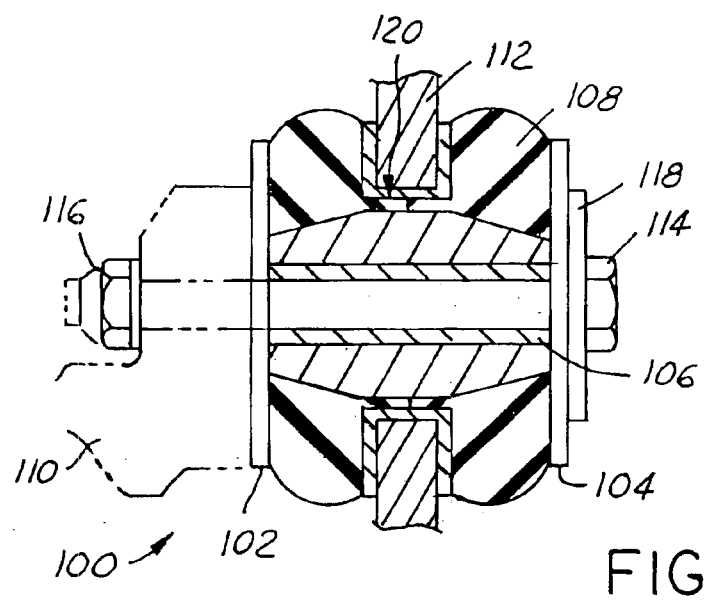
FIG. 14 illustrates a resilient mount for use with the present invention.
Figure 15:
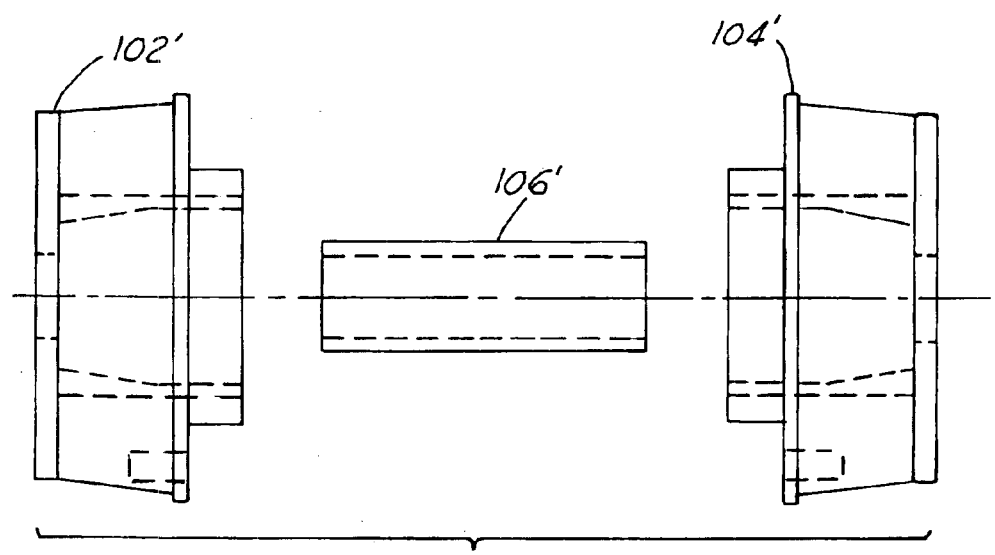
FIG. 15 illustrates some of the components for a resilient mount.

A preferred mount (or mounting member) 100 is shown in FIG. 14. The mount 100 is a resilient mount and includes a pair of end members 102 and 104, a central hollow tubular member 106 and an elastomeric material 108. (Some of the components of a preferred mount are shown in FIG. 15.). The elastomeric material can be any elastomeric material, such as rubber, which is used in resilient mounts known today. Resilient mounts of this type are shown, for example, in British Patent Nos. 554,860 and 548,527, the disclosures of which are hereby incorporated by reference herein. These patents disclose the DYNAFOCAL™ mount system referred to herein and which is a preferred system for use with the present invention.

FIG. 14 illustrates the mount 100 in a compressed condition attached to the aircraft frame 110 and securely mounting and holding the engine 112 in position. A fastener mechanism such as bolt 114 and nut 116 are used to compress the elastomeric material thereby holding the engine 112 in position and at the same time secure the mount 100 to the frame 110. The bolt 114 is positioned through the hollow tubular member 106. A washer 118 is positioned adjacent the head of the bolt 114.

The elastomeric material 108 can be formed on the mount 100 when it is made. The material 108 is molded in place between the two end members 102 and 104 providing a one-piece mount. A groove or recess 120 is provided in the elastomeric material for positioning and mounting of the engine 112. Alternatively, the component parts 102, 104, 106, and 108 can be provided separately and assembled and installed in place on the engine 112 when the engine is mounted on the airframe 110.

In this regard, the components for a preferred mount are shown in FIG. 15.

It is also to be understood that any conventional rubber or elastomeric mounting members can be used to attach (mount) the engine to the airframe in accordance with the present invention, so long as the mounting members have sufficient durability and performance in accordance with the specifications of the present invention.

FIGS. 4A and 4B show an engine 10 with an overall part-focalized mounting configuration according to the present invention at one (e.g. rearward) end opposite a thrust propeller mounting flange 13 for drive coupling to the crankshaft (not shown). More specifically, a pair of upper axial mounts 41 are disposed above the center of gravity 16 and (in this case symmetrically) upon opposite sides of the engine center thrust line 18.

The upper axial mounts 41 are matched with a pair of lower inclined mounts 43 which again in this example are symmetrically disposed about the thrust line 18. The lower inclined mounts 43 are disposed below the center of gravity 16 and orientated with their respective inclined axes 44 generally parallel to each other. In accordance with the scope of the present invention, various embodiments of paired inclined mounts with convergent axes can be utilized.

With either parallel or convergent inclined mounts a notional plane containing the inclined axes 44 intersects a notional plane containing the axes 42 of the upper axial mounts 41 at, or somewhat ahead of, the center of gravity 16. In the embodiment shown, the axes 42 are also situated below the thrust line 18, although they could also be coextensive with the thrust line 18. FIG. 4B shows the generally symmetrical disposition of upper axial mounts 41 and inclined, or (partially) convergent, lower mounts 43 with respect to a notional plane of symmetry 17 taken (vertically) through the center of gravity 16. In this, and the other embodiments the thrust axis 18 may also lie in the plane of symmetry 17.

FIGS. 5A and 5B shows paired lower axial mounts 61 and paired upper inclined mounts 63 with convergence of mount axes 65 below the engine thrust line 18. Again, the axes 65 of the paired inclined mounts may be parallel to each other.

FIG. 6 shows a variant of FIG. 4B in which the pair of lower inclined mounts (43) are replaced by a single lower inclined mount 53 whose axis 54 is similarly inclined but contained in the plane of symmetry 17. Again convergence of the axis 54 of the single lower inclined mount 53 with a notional plane containing the upper axial mounts 41 is generally at, or somewhat ahead of, the center of gravity 16. Convergence in relation to the thrust axis 18 may be the same as that shown in FIG. 4A, that is, somewhat below it.

FIG. 7 is an inversion, or reversal, of the FIG. 6 configuration with a single upper inclined mount 73 and a pair of lower axial mounts 61. Convergence of the axial and inclined mount axes is at, or ahead of, the center of gravity 16 and below the thrust axis.

Figure 8:
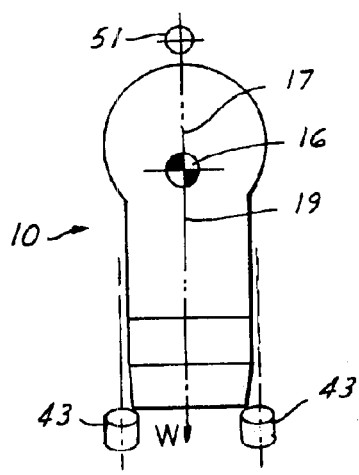

FIG. 8 depicts paired lower inclined mounts 43 and a single upper axial mount 51. The convergence of the axial and inclined mount axes is at, or ahead of, the center of gravity 16 and below the engine thrust axis.

Figure 9:
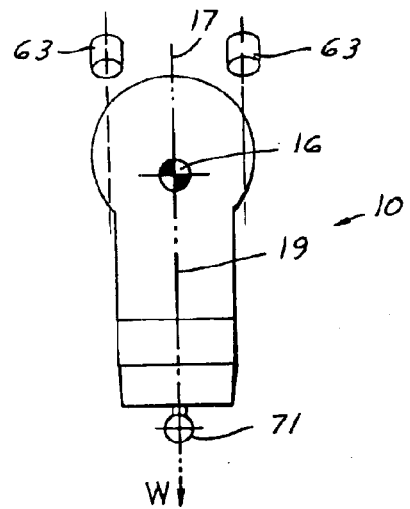

FIG. 9 is an inversion or reversal of the FIG. 8 configuration with a single lower axial mount 71 and paired upper inclined mounts 63. Again, axial and inclined mount axis convergence is at, or ahead of, the center of gravity 16 and below the engine thrust axis 18.

At least three mounts are needed for a balanced mounting. Four mounts provide some redundancy, but are preferable for optimum stability and balance.

Figure 10:
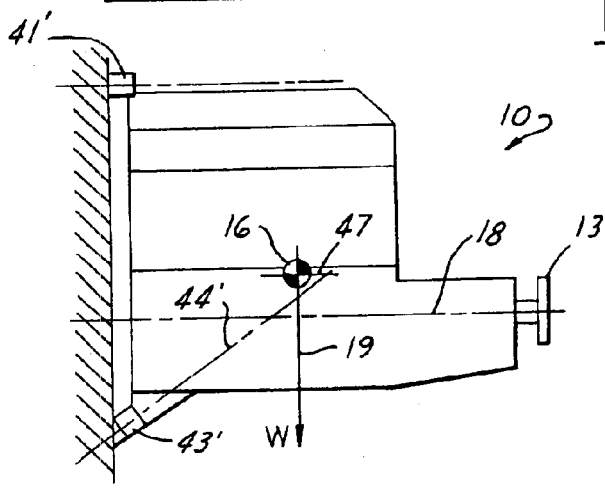
FIG. 10 shows the mount system of FIG. 4 applied to an upright (i.e. non-inverted) engine which has a lower crankshaft and upper cylinders—the various combinations of mount system of the invention (shown in FIGS. 4 through 9) can equally be applied to the engine type shown at FIG. 10.

FIG. 10 shows the mount system of FIGS. 4A–4B but applied to an upright (i.e. non-inverted) engine which has a lower crankshaft and upper cylinders. A pair of upper axial mounts 41' are disposed above the center of gravity 16 on opposite sides of the engine thrust line 18. A pair of lower inclined mounts 43' are also symmetrically dispersed about the thrust line 18. The inclined axes 44' of the two lower mounts intersect an axial extending axis 47 through the center of gravity 16 forward of the center of gravity. The axes 44' can be convergent or parallel to one another.

Figures 11A, 11B:
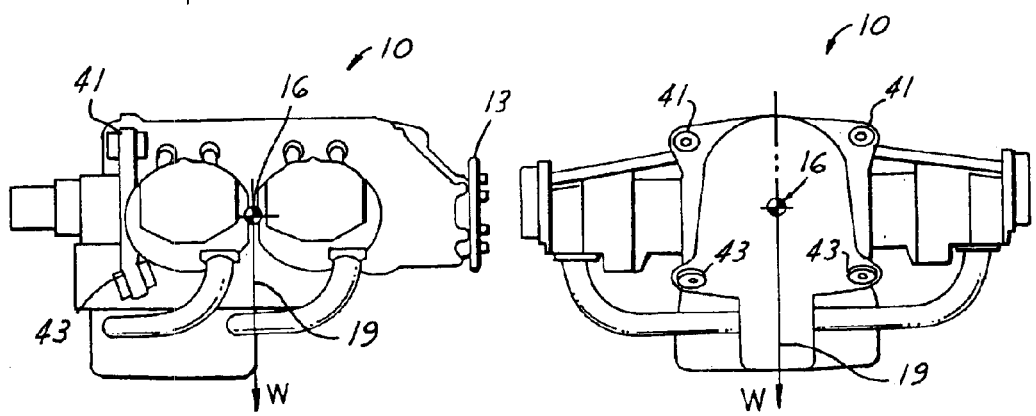
FIGS. 11A and 11B illustrates a mounting system for an inverted engine similar to FIG. 4.
Figure 12:
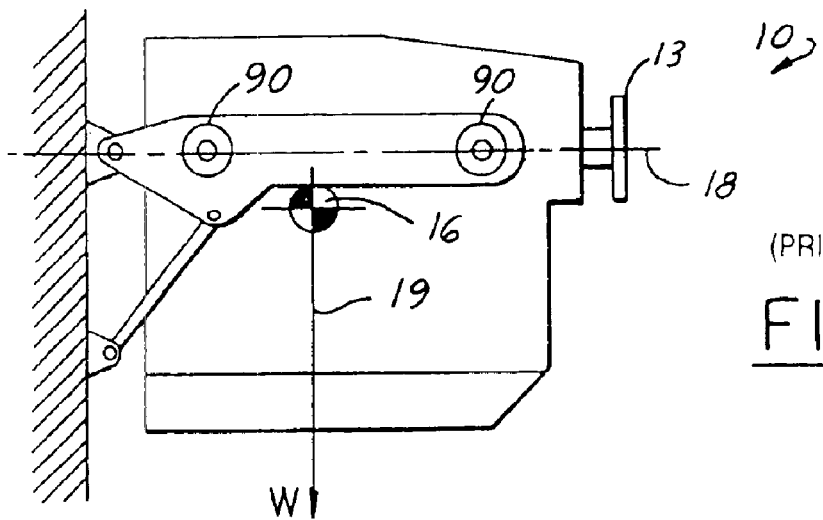
FIGS. 12 and 13 illustrate additional known mounting systems.
Figure 13A:
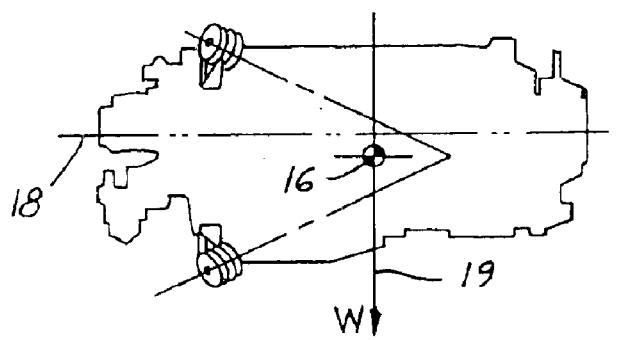
Figure 13B:
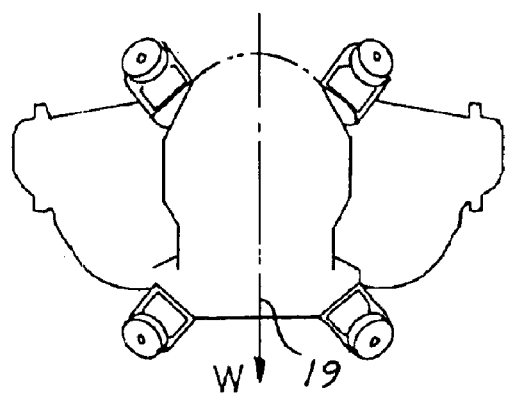

FIGS. 11A–11B show another mounting system similar to FIGS. 4A–4B and used with a horizontal opposed engine.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A mounting assembly for connecting an aircraft engine to a bulkhead of an aircraft, said aircraft engine having a thrust axis and a center of gravity, said mounting assembly comprising:

a first axial mounting member for connecting an engine to a bulkhead, said first axial mounting member having a first axial longitudinal axis which is substantially parallel to said thrust axis and said first mounting member comprising an elastomeric member; and a first inclined mounting member for connecting an engine to a bulkhead, said first inclined mounting member having a first inclined longitudinal axis which is oriented to intersect a horizontal notional plane containing said first axial longitudinal axis at least at said center of gravity, said first inclined mounting member comprising an elastomeric member;

wherein the engine is directly retained by the mounting members:

wherein a resilient engine-to-aircraft mounting assembly is provided.

2. The mounting assembly as set forth in claim 1 further comprising a second axial mounting member for connecting an engine to a bulkhead, said second axial mounting member having a second axial longitudinal axis substantially parallel to said first axial longitudinal axis.

3. The mounting assembly as set forth in claim 2 wherein said second axial mounting member comprises an elastomeric member.

4. The mounting assembly as set forth in claim 2 wherein said first and second axial mounting members are adapted to be positioned vertically above said first inclined mounting member.

5. The mounting assembly as set forth in claim 2 wherein said first and second axial mounting members are positioned at a first vertical level in said horizontal notional plane arid said first inclined mounting member is positioned at a second vertical level below said horizontal notional plane.

6. The mounting assembly as set forth in claim 4 wherein said first and second axial mounting members are positioned at a upper vertical level above said engine center of gravity, and wherein said first inclined mounting member is positioned at a lower vertical level below the engine thrust axis and below said center of gravity.

7. The mounting assembly as set forth in claim 1 further comprising a second inclined mounting member.

8. The mounting assembly as set forth in claim 1 further comprising a second axial mounting member having a second axial longitudinal axle and a second inclined mounting member having a second inclined longitudinal axis, said first axial longitudinal axis of said first axial mounting member and said first inclined longitudinal axis of said first inclined mounting member being convergent at a point at least at the engine center of gravity.

9. The mounting assembly as set forth in claim 8 wherein said second axial longitudinal axis and said second inclined longitudinal axis are convergent at a point at least at the engine center of gravity.

10. The mounting assembly as set forth in claim 1 wherein the aircraft engine is a piston engine and drives a propeller.

11. The mounting assembly as set forth in claim 8 wherein said second axial mounting member and said second inclined mounting member each comprise an elastomeric member.

12. The mount configuration as set forth in claim 1 wherein at least two inclined mounts are provided and said axes thereof are convergent with respect to the vertical notional plane containing the engine center of gravity.

13. The mount configuration as set forth in claim 1 wherein a pair of axial mounts are provided at a lower vertical level below the engine center of gravity, and wherein said at least one inclined mount is provided at an upper vertical level above the engine thrust line and above the center of gravity.

14. The mount configuration as set forth in claim 1 wherein a pair of axial mounts and a pair of inclined mounts are provided, the respective axes of each pair of mounts being generally parallel.

15. The mount configuration as set forth in claim 1 wherein said engine is an inverted two-stroke compression ignition engine.

16. The mount configuration as set forth in claim 1 wherein the aircraft engine is a gas turbine engine and drives a propeller.

17. The mount configuration as set forth in claim 1 wherein the aircraft engine is a rotary piston engine and drives a propeller.

* * * * *